(12) United States Patent
Liberti

(10) Patent No.: US 12,485,412 B2
(45) Date of Patent: Dec. 2, 2025

(54) KIT INCLUDING BIOTIN FOR HARVESTING PLATELET-RICH PLASMA

(71) Applicant: Lance Liberti, Tampa, FL (US)

(72) Inventor: Lance Liberti, Tampa, FL (US)

( * ) Notice: Subject to any disclaimer, the term of this patent is extended or adjusted under 35 U.S.C. 154(b) by 502 days.

(21) Appl. No.: 17/877,268

(22) Filed: Jul. 29, 2022

(65) Prior Publication Data

US 2023/0038636 A1 Feb. 9, 2023

Related U.S. Application Data

(60) Provisional application No. 63/229,994, filed on Aug. 5, 2021.

(51) Int. Cl.
*B01L 3/00* (2006.01)

(52) U.S. Cl.
CPC ... *B01L 3/50215* (2013.01); *B01L 2300/0832* (2013.01); *B01L 2400/0409* (2013.01)

(58) Field of Classification Search
CPC ......... B01L 3/50215; B01L 2300/0832; B01L 2400/0409
See application file for complete search history.

(56) References Cited

U.S. PATENT DOCUMENTS

2014/0220552 A1* 8/2014 Moskowitz ............ G01N 33/86
  435/307.1
2019/0358266 A1* 11/2019 Suescun, Jr. ........... A61K 47/46

OTHER PUBLICATIONS

Galleria Medical Pharmacy (https://galleriamedpharmacy.com/product/biotin-injection/ Jun. 2021) (Year: 2021).*
NuSkin Beauty Clinic (view-source:https://thenuskinbeautyclinic.co.uk/biotin-injections/ Apr. 2021) (Year: 2021).*
Bruin et al. ("Biotinylation of platelets for transfusion purposes a novel method to label platelets in a closed system," Transfusion, vol. 59, Sep. 2019) (Year: 2019).*
"Expert consensus on the management of Telogen Effluvium in India," International Journal of Trichology 11(3):p. 107-112, May-Jun. 2019). (Year: 2019).*

* cited by examiner

*Primary Examiner* — Jill A Warden
*Assistant Examiner* — Michael Stanley Gzybowski
(74) *Attorney, Agent, or Firm* — Barry Choobin; Patent 360

(57) ABSTRACT

A PRP harvesting kit for harvesting platelet rich plasma that includes one or more collection tubes, each collection tube includes liquid biotin in an injectable form.

6 Claims, 1 Drawing Sheet

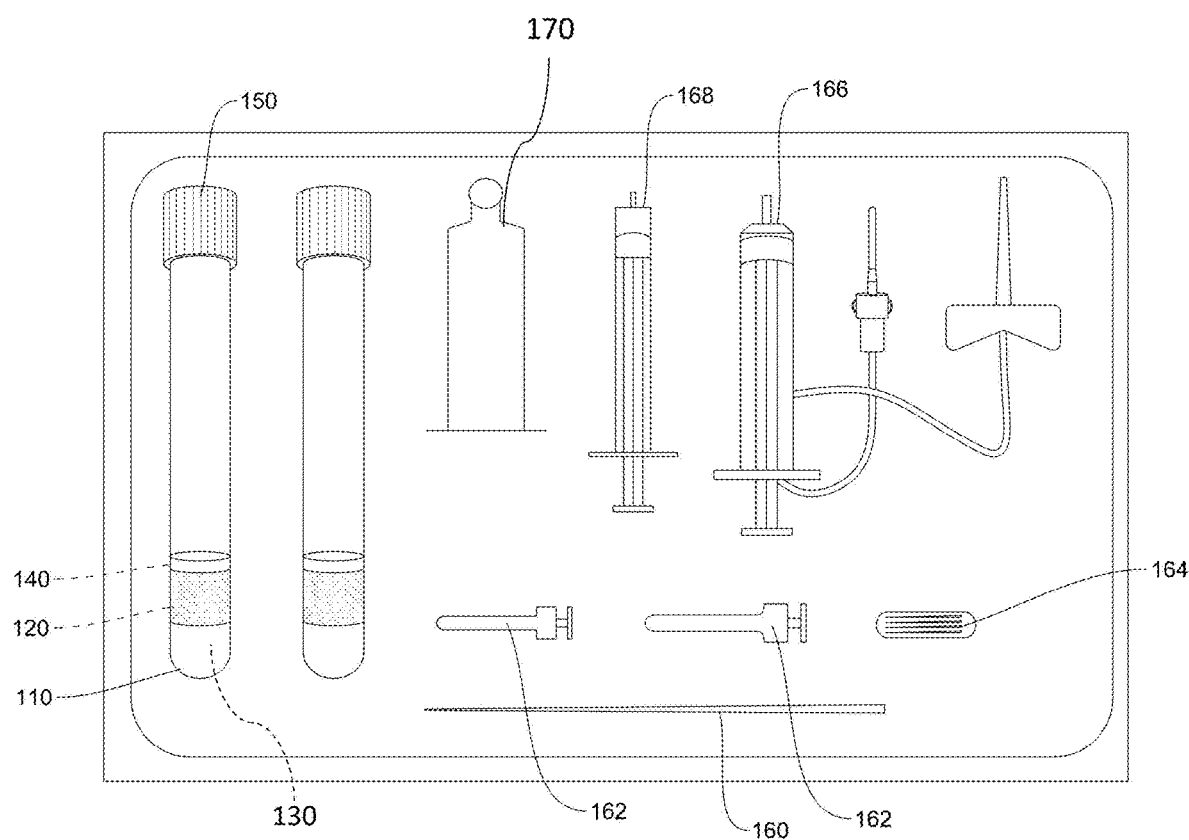

KIT INCLUDING BIOTIN FOR HARVESTING PLATELET-RICH PLASMA

CROSS-REFERENCE TO RELATED APPLICATIONS

This application claims priority from a U.S. Provisional Patent Appl. No. 63/229,994 filed on Aug. 5, 2021, which is incorporated herein by reference in its entirety.

FIELD OF INVENTION

The present invention relates to an injectable formulation of a combination of platelet-rich plasma and Biotin, and a kit for harvesting the platelet-rich plasma.

BACKGROUND

Platelets are a naturally occurring component in blood, which plays an important role in the body's healing processes. Through a process called centrifugation, platelets are isolated from a whole blood sample for therapeutic use. The resulting golden-colored sample is called Platelet Rich Plasma, or PRP. These platelets contain crucial growth factors that have been shown to stimulate tissue generation and repair that aid in the healing process of injuries as well as the rejuvenation of hair, skin, and nerves. When activated at a site of injury, platelets release proteins FGF, PDGF, TGF-B, EGF, VEGF, and IGF, which attract cells and contribute to regrowth. Platelets can restore tendons, ligamentous proteins, and cartilage with minimal downtime when used to treat joint and tendon injuries. Platelets generate new cell growth and stimulate collagen when applied and/or injected into the skin. When injected into the scalp, PRP works to spur new hair growth that is thicker and denser. PRP stimulates the follicles to move from the telogen, or dormant, stage, to the anagen, or growing, stage. PRP therapy is natural, convenient, and safe with many vigorous studies demonstrating PRP therapy to be more effective when compared to other conservative medical treatments. PRP treatment is broadly used today among many medical specialties, including Dentistry, Orthopedics, Neurology, Internal Medicine, Cosmetic/Aesthetic Medicine, Urology, and Would Care. There is no occurrence of allergy or foreign body reaction using PRP therapy as treatment is completely autologous. However, the known methods for extracting PRP use chemical and drug activators carry the risk of allergic reactions or adverse vascular events.

Biotin (B7) is a B complex vitamin that naturally occurs in foods, such as liver, legumes, tomatoes, soybeans, and carrots. B vitamins are a member of the water-soluble vitamin family and contribute to several naturally occurring reactions in the body between various enzymes, or carboxylases. While Biotin deficiency is extremely rare, it may cause dermatitis, brittle fingernails, diabetes, hair loss, and perosis. Biotin is necessary for healthy skin, nails, and hair. Recent studies suggest that subjects being treated with Biotin supplementation for hair thinning perceived improvements in overall hair volume, scalp coverage, and thickness of hair body after 90 days. Additional improvements after 180 days included hair shine, skin moisture retention, and skin smoothness. B7 supplementation supports keratin infrastructure and has been seen to stimulate and support follicle health. The Mayo Clinic states that no adverse events or toxicities can be found from B7 supplementation in amounts up to 10 milligrams.

Oral supplemental Biotin may be beneficial for hair regrowth but is dependent on patient consistency, proper dosage, and supplement purity. Vitamin B7 is water-soluble and does not bind to lipids in cells. Oral Vitamin B7 supplements are vulnerable to acids in the gut. Therefore, orally B7 supplementation is largely destroyed in the gut and/or expelled through the urine.

Thus, a need is appreciated for therapy and a kit for delivering the therapy that is devoid of the aforesaid drawbacks.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a kit for PRP harvesting, a PRP collection tube that includes Biotin in injectable form, and a method for PRP harvesting.

It is another object of the present invention that the disclosed method and kit do not include harmful chemicals.

It is still another object of the present invention that the PRP and Biotin can be injected together.

It is a further object of the present invention that the sterility of Biotin and PRP can be maintained.

It is yet another object of the present invention that the additional steps in the preparation and administration that may introduce contamination can be avoided.

In one aspect, disclosed is a PRP harvesting kit comprising one or more collection tubes, each collection tube comprises liquid biotin in an injectable form. The collection tube further comprises a gel separator, wherein the liquid biotin is contained below the gel separator. Each collection tube further comprises an anticoagulant. At least one collection tube of the one or more collection tubes further comprises platelet rich plasma. Each collection tube is 10 ml in capacity and 2 ml of liquid biotin is contained in each collection tube. The anticoagulant is citric acid based.

In one aspect, disclosed is a collection tube for platelet rich plasma harvesting from blood, the collection tube is configured to be used in a centrifugation device, the collection tube comprises liquid biotin in an injectable form. The collection tube further comprises a gel separator, wherein the liquid biotin is contained below the gel separator. The collection tube further comprises an anticoagulant. The collection tube further comprises platelet rich plasma. Each collection tube is 10 ml in capacity and 2 ml of liquid biotin is contained in each collection tube. The anticoagulant is citric acid based.

BRIEF DESCRIPTION OF THE DRAWINGS

The accompanying FIGURE, which are incorporated herein, form part of the specification and illustrate embodiments of the present invention. Together with the description, the FIGURE further explains the principles of the present invention and enables a person skilled in the relevant arts to make and use the invention.

FIG. 1 shows a PRP harvesting kit, according to an exemplary embodiment of the present invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawing. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawing may not be to scale.

Disclosed is a medical device with higher efficiency and safety for patients seeking treatment with platelet-rich plasma (PRP) in combination with Biotin (B7) for hair restoration. More particularly, disclosed is a PRP harvesting kit, and more particularly, disclosed is a PRP collection tube that includes Biotin in liquid injectable form.

Referring to FIG. 1 shows an exemplary embodiment of harvesting kit 100. The harvesting kit can include one or more PRP tubes 110, also known as blood collection tubes. The blood collected from a patient can be taken into the PRP tubes and the PRP tubes can be centrifuged to separate the platelet-rich plasma and platelet-poor plasma. The PRP tube can include a gel 120 and liquid biotin 130 contained in the tube, the Biotin is filled below the gel. The PRP tube may also contain an anticoagulant 140, such as a citric acid-based anticoagulant. Any other anticoagulant is within the scope of the present invention. Moreover, FIG. 1 shows the anticoagulant above the gel, however, the anticoagulant can be provided in any other way or position without departing from the scope of the present invention.

The disclosed Kit and collection tube provides for the one-step treatment of hair loss and/or thinning in a safe, consistent, chemical-free, and drug-free manner. The collection tube is a closed cycle designed with about 2 ml of Biotin included. It is understood, however, that amount of liquid biotin can vary without departing from the scope of the present invention. The Kit is sterile, non-pyrogenic, pH balanced, and includes no chemical activators for optimal safety and comfort.

In one aspect, disclosed is a Platelet Rich Plasma harvesting kit with pure liquid Biotin included within the collection tube for the one-step treatment of hair loss and/or thinning in a safe, consistent, chemical-free, and drug-free manner. The disclosed Kit includes sterile, non-pyrogenic 10 ml blood collection tubes 110 topped with rubber vacutainers 150 for easy filling and drawing. The 10 ml size fits most standard centrifuge models. Each 10 ml tube is pre-filled with 2 ml of liquid vitamin B7 (Biotin) below the tube's gel separator 120. The gel separator layer is a non-bioactive weighted gel, which acts as a valve to partition the red blood cells and granulocytes from the platelet-rich plasma and vitamin B7 after sample processing. An anticoagulant, in the form of PH-balanced Citric acid, prevents the coagulation of the platelet-rich plasma and vitamin B7 mixture for ease of injection and maximum treatment success. The B7 component of the mixture will work to support the keratin structure of the hair, resulting in increased hair thickness and shine. The PRP component of the mixture works to increase the health of hair follicles and the increased speed of hair growth. Independent third-party laboratory testing revealed astonishing PRP sample purity with zero inclusion of granulocytes, lymphocytes, monocytes, or hematocrit and just 0.01 inclusion of red blood cells. The Kit also includes one 18 G spinal needle 160 used to draw the prepared PRP from the tube(s), two 30 G meso-needles 162 used to vent the tubes of prepared PRP, a one-stop cock 164 used to transfer PRP between two syringes, one 5 ml syringe 166 used to collect the Platelet Poor Plasma from the tube(s), and one 2 ml syringe 168 was used to collect Platelet Rich Plasma from the tube(s). It is understood, however, that the collection tube can preferably be of a capacity of 10 ml, however, the size of the collection tube can be varied without departing from the scope of the present invention. FIG. 1 also shows a needle holder 170 that is used to draw the blood.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A platelet rich plasma (PRP) harvesting kit comprising:
one or more collection tubes, each collection tube configured for blood collection and centrifugation in a centrifugation apparatus, the each collection tube comprises:

a gel separator configured to partition red blood cells and granulocytes from platelet-rich plasma, and liquid biotin in an injectable formulation contained below the gel separator.

2. The PRP harvesting kit according to claim 1, wherein each collection tube further comprises:

an anticoagulant above the gel separator.

3. The PRP harvesting kit according to claim 1, wherein at least one of the one or more collection tubes is configured to separate blood, under centrifugation, between platelet-poor plasma and platelet-rich plasma and retaining the platelet-poor plasma and platelet-rich plasma below the gel separator.

4. The PRP harvesting kit according to claim 1, wherein each collection tube is 10 ml in capacity and 2 ml of liquid biotin is contained in each collection tube.

5. The PRP harvesting kit according to claim 2, wherein the anticoagulant is citric acid based.

6. A method for promoting hair growth, the method comprises:

providing a collection tube configured for blood collection and centrifugation in a centrifugation apparatus, the collection tube comprises:

a gel separator configured to partition red blood cells and granulocytes from platelet-rich plasma, and liquid biotin in an injectable formulation contained below the gel separator;

receiving blood into the collection tube;

centrifuging the blood into the platelet-rich plasma and platelet-poor plasma.

\* \* \* \* \*